(12) United States Patent
Chen et al.

(10) Patent No.: US 11,151,892 B2
(45) Date of Patent: Oct. 19, 2021

(54) INTERNET TEACHING PLATFORM-BASED FOLLOWING TEACHING SYSTEM

(71) Applicant: SHENZHEN EAGLESOUL TECHNOLOGY CO., LTD., Shenzhen (CN)

(72) Inventors: Kengfan Chen, Shenzhen (CN); Shanguo Liu, Dalian (CN); Shengqiang Liu, Dalian (CN)

(73) Assignee: SHENZHEN EAGLESOUL TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/467,345

(22) PCT Filed: Nov. 20, 2017

(86) PCT No.: PCT/CN2017/111817
§ 371 (c)(1),
(2) Date: Jun. 6, 2019

(87) PCT Pub. No.: WO2019/075826
PCT Pub. Date: Apr. 25, 2019

(65) Prior Publication Data
US 2020/0242953 A1 Jul. 30, 2020

(30) Foreign Application Priority Data
Oct. 20, 2017 (CN) .......................... 201710981851.2

(51) Int. Cl.
*G09B 5/14* (2006.01)
*G09B 5/06* (2006.01)

(52) U.S. Cl.
CPC .............. *G09B 5/14* (2013.01); *G09B 5/065* (2013.01)

(58) Field of Classification Search
CPC ................................. G09B 5/14; G09B 5/065
See application file for complete search history.

(56) References Cited

U.S. PATENT DOCUMENTS

| | | | |
|---|---|---|---|
| 2004/0191744 A1* | 9/2004 | Guirguis | G09B 7/00 434/322 |
| 2011/0123972 A1* | 5/2011 | Friedman | H04N 7/15 434/308 |

(Continued)

FOREIGN PATENT DOCUMENTS

| | | |
|---|---|---|
| CN | 101833882 | 9/2010 |
| CN | 103295171 | 9/2013 |

(Continued)

OTHER PUBLICATIONS

International search report of PCT/CN2017/111817.
Written Opinion of PCT/CN2017/111817.
R0/101 of PCT/CN2017/11817.

*Primary Examiner* — Justin S Lee
(74) *Attorney, Agent, or Firm* — Dragon Sun Law Firm, PC; Jinggao Li, Esq.

(57) ABSTRACT

The present disclosure provides an Internet teaching platform-based following teaching system. By using a recording and broadcasting system of an Internet teaching platform, recording class teaching of a standard teacher and then performing standardization segmentation processing on data of the recorded class teaching, a standard teaching recorded and broadcast course is formed, and after learning the standard teaching recorded and broadcast course, a following teacher can imitate the standard teacher to perform local class teaching, which is also recorded by means of the recording and broadcasting system. By using the system of the present disclosure to perform processing of relationship construction, statistics, analysis and comparison on a variety of collected data, the recording and guiding before, during (Continued)

and after a teaching process of the following teacher can be realized, so as to facilitate the following teacher in effectively completing the local class teaching.

11 Claims, 5 Drawing Sheets

(56) References Cited

U.S. PATENT DOCUMENTS

| | | | | |
|---|---|---|---|---|
| 2011/0246645 A1* | 10/2011 | Martin | ...................... | G09B 7/02 709/224 |
| 2012/0231441 A1* | 9/2012 | Parthasarathy | .......... | G09B 7/02 434/362 |
| 2012/0237914 A1* | 9/2012 | Spector | ................. | G09B 5/062 434/307 R |
| 2013/0323706 A1* | 12/2013 | Haq | ....................... | G09B 19/00 434/365 |
| 2015/0310756 A1* | 10/2015 | Nakamura | ............. | G06Q 50/20 434/362 |
| 2016/0063881 A1* | 3/2016 | Brinton | .................... | G09B 7/00 434/353 |
| 2016/0225278 A1* | 8/2016 | Leddy | ....................... | G09B 5/06 |
| 2016/0300501 A1* | 10/2016 | Yan | .......................... | G09B 5/06 |
| 2018/0285997 A1* | 10/2018 | Bostick | ................... | G09B 9/00 |
| 2019/0102722 A1* | 4/2019 | Chetlur | ............ | G06Q 10/06398 |

FOREIGN PATENT DOCUMENTS

| | | |
|---|---|---|
| CN | 203366564 | 12/2013 |
| CN | 105306861 | 2/2016 |
| CN | 106355350 | 1/2017 |
| CN | 106485964 | 3/2017 |
| CN | 106898169 | 6/2017 |
| JP | 2004227237 | 8/2004 |

* cited by examiner

INTERNET TEACHING PLATFORM-BASED FOLLOWING TEACHING SYSTEM

CROSS-REFERENCE TO RELATED APPLICATIONS

This application is a national stage application of PCT Application No. PCT/CN2017/111817. This Application claims priority from PCT Application No. PCT/CN2017/111817, filed Nov. 20, 2017, and CN Application No. 201710981851.2, filed Oct. 20, 2017, the contents of which are incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the present disclosure described herein. All references cited and discussed in this specification are incorporated herein by reference in their entireties and to the same extent as if each reference was individually incorporated by reference.

TECHNICAL FIELD

The present disclosure relates to the technical field of Internet teaching, and in particular to an Internet teaching platform-based following teaching system.

BACKGROUND ART

In recent years, with the flourishing of Internet teaching technology, a large number of various Internet teaching platforms have emerged. These Internet teaching platforms make the sharing of teaching resources more convenient by means of Internet technology, and mainly make audio and video contents on site, such as class teaching, lectures, and conferences, and even the contents for integrated presentation into multimedia files, and store same on a teaching server connected to the Internet, such that by means of the on demand and live broadcasting technologies, a user can watch online or review these teaching contents over the Internet anytime and anywhere. With the increasing popularity of the Internet, particularly the mobile Internet, Internet users can conveniently conduct online teaching, remote teaching, class live broadcasting, etc. However, these Internet teaching platforms mainly focus on the recording of the teaching process and the interaction between teachers and students, for example, such teaching recording and broadcasting systems or teaching platforms in the prior art:

CN101833882A (Date of Publication: Sep. 15, 2010) discloses a course recording system for teaching, comprising a multimedia classroom module (such as a dais, a central control, a stand, a notebook and a projector), a classroom scene camera collection module, an automatic tracking and detection module, a recording and broadcasting workstation, a B/S architecture on-demand module, an edit workstation, a recording and broadcasting system resource management module, external conditions, etc.

CN 106355350A (Date of Publication: Jan. 25, 2017) discloses a smart campus system, comprising a campus management subsystem 1 and a campus teaching subsystem 2, wherein a smart reading assessment subsystem can analyze, calculate and rank the received data, such as the frequency and time at which students enter and leave a reading room, and the titles and number of the books that they read, and then present a ranking list on a cloud interactive electronic blackboard 108 so as to stimulate the students' enthusiasm for learning.

CN 105306861A (Date of Publication: Feb. 3, 2016) discloses a reliable teaching recording and broadcasting method for a system, the method comprising: separately storing the recording and classification of classified data, generating a unified time stamp for marking, performing simple segmentation on data that needs to be encrypted to establish a correlation table, and separately acquiring recorded data according to demands, so as to realize smooth transfer of data. In addition, these pieces of data are organically combined by using a client on a local terminal, and even only part of data is acquired for broadcasting according to the demands of the client, such that the problem of teaching recording and broadcasting is systematically solved.

CN103295171A (Date of Publication: Sep. 11, 2013) discloses an intelligent recording and broadcasting system-based automatic S-T teaching analysis method, the system comprising an audio and video on-site collection and recording and broadcasting system, a network transmission system and a remote broadcasting system, and the method comprising the following steps: I. acquiring a switching mode for a signal source in the process of recording performed by the audio and video on-site collection and recording and broadcasting system; II. performing conversion processing on the switching mode and generating an xml file, III. defining parameters in a video source file of the xml file as teacher and student behaviors, IV. calculating the percentage of the teacher behavior, the percentage of the student behavior, and a conversion rate; and V. presenting a graph of S-T behaviors by using a web interface. By means of the present disclosure, a teacher can record and broadcast a course, while a recording and broadcasting host converts intelligent switching information about a video source position into a teacher behavior information sequence table and a student behavior information sequence table, and after the recording of a video is completed and is subjected to automatic encoding, an intuitive S-T histogram can be directly generated so as to calculate the conversion rate of this lesson example and determine the type of teaching according to a norm.

CN106485964 A (Date of Publication: Mar. 8, 2017) discloses a system for the recording and on-demand recording of class teaching, comprising: during course recording, according to main points for explanation in class and by means of generating a specific time stamp identifier, marking and segmenting recorded class teaching data, and constructing an association relationship database for the correspondences between the main points for explanation in class and the segmented teaching data. The class teaching data may be combined data composed of an action stream, an audio stream, and an image stream. Particularly preferably, the "marking and segmentation" of the recorded class teaching data of the present disclosure does not substantially cut or segment the recorded class teaching data, but identifying same in segments by means of time stamp identifiers, and such marking and segmentation may be of multiple levels, not one segment only corresponding to one point for explanation. The use of time stamp identifiers facilitates the establishment of correlations for different levels of "segmented and identified data" according to needs. The method comprises: a course recording step, which is used for recording class teaching data, segmenting and identifying the recorded class teaching data in a time order of main points for explanation in class so as to form segmented and marked class data corresponding to the main points for explanation in class, and establishing an association database for the correspondences between the main points for explanation in class and the segmented and marked class data. The main points for explanation in class comprise multiple different levels of main points having a high-low affiliation relationship. According to different levels of main points involved in the recorded class teaching data, the segmented and marked class data can correspond to the corresponding specific main points of a lower level and main points of a high level thereof, and a correlation list is established in the corresponding database for associations according to a time relationship. A collection device respectively collects an image data stream+a time stamp, an audio data stream+a time stamp and an action data stream+a time stamp during the lecturing by a teacher, and respectively distributes same in real time via a server, such that online live broadcasting of a class is realized, and a user terminal of a student acquires the three types of distributed data streams in real time and locally recombined same according to time stamps so as to realize online learning. The time stamps are uniformly generated by a teaching server. The image data stream+a time stamp, an audio data stream+a time stamp and an action data stream+a time stamp obtained by the collection device are processed and then stored in a storage device, wherein the storage device may be a local memory (a local disk array) or a network cloud memory and any combination thereof.

It can be seen that the technical problems to be solved by various teaching systems in the prior art mainly lie in the techniques in terms of the recording of a teaching process, online sharing, interactive learning, etc., aiming to collect class teaching data via a recording and broadcasting system and transmit the collected teaching data over the network, such that the class teaching can be reproduced on a user client of a student so as to achieve the purpose of network teaching.

The inventor of the present application have intensively implemented the technical project in the front-line teaching of primary and secondary schools, and especially in the investigation of remote mountain areas, it is difficult for the students in the areas to directly learn, due to the reasons in such aspects as teaching background and knowledge background, the network teaching courses provided in education developed areas, and the learning effect is relatively poor even if following learning is conducted, which needs a local teacher to firstly learn the network courses and then conduct actual teaching activities by means of a local class teaching mode with reference to the teaching mode for network teaching courses and also conjunction with actual situations. Objectively speaking, the teaching subject and core strength for education in primary and secondary schools are surely still primary and secondary school teachers for a relatively long period now and in the future, and it is foreseeable that various modern teaching means will be increasingly adopted in the future, but the main teaching activities will still be performed by means of class teaching. At present, for the education in primary and secondary schools, various network teaching systems mainly play the role of real-time assistance in class teaching, process extension, etc., and unlikely completely replace the class teaching. Front-line teachers, especially those in underdeveloped areas who are eager to improve the teaching level, have such a demand: during the process of conducting the following teaching of the network teaching courses provided in education developed areas, that is, during the processing like imitative teaching, the teachers in underdeveloped areas (local teachers) hope to provide, with the help of technologies or software systems capable of analyzing and assisting the process of following teaching in real time, technical support for the process of following teaching of local teachers, so as to facilitate the improvement in the teaching level of the local teachers and in the teaching quality and teaching effect of local teaching, that is to say, it has not been proposed in the prior art to form a standard teaching recorded and broadcast course and a following teaching recorded and broadcast course for comparing same in segments, and synchronously playing back and displaying same to a follow teacher, so as to analyze and guide the following class teaching.

By means of retrieval and analysis of the prior art, the inventor has not found that there is an Internet teaching platform-based following teaching scheme in the prior art. The present disclosure is directed to the problem, existing in the prior art, discovered by the inventor. Over the Internet teaching platform, a teaching recording and broadcasting system is used to collect, analyze and evaluate related data before, during and after the process of a following teacher conducting following class teaching, so as to provide real-time analysis, guidance and assistance and thus analyze and guide the whole following class teaching, thereby facilitating improving the efficiency and teaching effect of following teaching.

Therefore, a heretofore unaddressed need exists in the art to address the aforementioned deficiencies and inadequacies.

SUMMARY OF THE INVENTION

In order to solve the above-mentioned technical problems, the present disclosure provides an Internet teaching platform-based following teaching system, wherein the Internet teaching platform has a class teaching recording function, and the following teaching system comprises the following units:

a standard course forming unit for collecting class teaching data of a standard teacher by using a teaching recording and broadcasting system of the Internet teaching platform, and processing the class teaching data in segments, for example, in a pre-class test stage, a class lecturing stage and an in-class practice stage, wherein each of the stages is identified and distinguished by using information about a time identifier, and the information about a time identifier is saved together with the class teaching data so as to constitute standard teaching recorded and broadcast data, thereby forming a standard teaching recorded and broadcast course;

a following teaching recording unit for collecting class teaching data of a following teacher by using a teaching recording and broadcasting system of the Internet teaching platform, analyzing pre-class test result data of the class teaching data in real time, comparing the results analyzed in real time with corresponding data of the standard teaching recorded and broadcast data, setting a suggested lecturing time for a class lecturing stage of the following teacher according to a comparison result, and recording the suggested lecturing time and an actual lecturing time, wherein the suggested lecturing time and the actual lecturing time are saved together with the class teaching data so as to constitute following teaching recorded and broadcast data, thereby forming a following teaching recorded and broadcast course: and a following teaching analysis unit for analyzing the following teaching recorded and broadcast data ex post facto, comparing same with the standard teaching recorded and broadcast data in segments, including the comparison between the suggested lecturing time and the actual lecturing time in each of the stages, and the comparison of information about voice text in each of the stages, and synchronously playing back the following teaching recorded and broadcast course and the standard teaching recorded and broadcast course and displaying same to the following teacher.

The standard course forming unit specifically comprises:

a relational data construction unit for dividing knowledge points of a class syllabus of each course, generating keywords by using the knowledge points as data items and according to the knowledge points, establishing a correlation between the keywords and the knowledge points, and establishing, on the basis of the data items and according to the comparison of information about attributes between exercises in a pre-class test and exercises in in-class practice, an association relationship, which takes the knowledge points as associated points, among various types of data, thereby constructing a relational database;

a standard teaching recording unit for collecting class teaching data by using a teaching recording and broadcasting device of a teaching recording and broadcasting system, for example, respectively collecting image data, audio data and motion data by using an image collection device, an audio collection device and/or a motion collection device, wherein the data can be respectively saved in the form of data streams and can be time stamped by a time stamp;

a pre-class test analysis unit for performing real-time analysis on test results of a basic knowledge test conducted by a student over a student terminal after the start of class teaching and before the class lecturing stage, so as to form pre-class test result analysis data;

an in-class practice analysis unit for performing real-time analysis on test results of an in-class practice test conducted by a student over a student terminal before the end of class teaching and after the class lecturing stage, so as to form in-class practice result analysis data; and a voice recognition and conversion unit for converting audio data of the class teaching data into information about voice text by using a voice recognition technology, and counting word frequency numbers of keywords in information about standard voice text corresponding to each of the knowledge points.

The information about standard voice text comprises information about a time stamp of the audio data, such that a correlation between voice text and the audio data can be established based on the information about a time stamp, and thus the information about standard voice text can be displayed in the form of subtitles when the standard teaching recorded and broadcast course is played back on-demand.

The division of the knowledge points comprises three steps:

step I: dividing the class syllabus into basic knowledge and newly lectured knowledge to serve as a first-level data item;

step II: further dividing the basic knowledge into several basic knowledge points, and further dividing the newly lectured knowledge into several newly lectured knowledge points to serve as a second-level data item, and step III: based on the association relationship between the basic knowledge points and the newly lectured knowledge points, further improving the data structure of the relational database.

The following teaching recording unit specifically comprises:

a relational data invoking unit for retrieving the relational database at the beginning of following class teaching, so as to provide data support for the following execution of unit functions:

a following teaching data collection unit for collecting class teaching data by using a teaching recording and broadcasting device of a teaching recording and broadcasting system, for example, respectively collecting image data, audio data and motion data by using an image collection device, an audio collection device and/or a motion collection device, wherein the data can be respectively saved in the form of data streams and can be time stamped by a time stamp;

a pre-class test comparison unit for performing real-time analysis on test results of a basic knowledge test conducted by a student over a student terminal after the start of following class teaching and before a following class lecturing stage so as to form pre-class test result analysis data, comparing the pre-class test analysis result with a pre-class test analysis result of a standard course, providing, to the following teacher, the student's master of the basic knowledge points as well as the difference between the student and a student in a standard class, and giving a suggested lecturing time concerning the knowledge points according to the difference and information about an association of the knowledge points in the relational database in conjunction with a lecturing time for the knowledge points in standard class; and an in-class practice analysis unit for performing real-time analysis on test results of an in-class practice test conducted by a student over a student terminal before the end of class teaching and after the class lecturing stage, so as to form in-class practice result analysis data.

The exercises in the pre-class test and the exercises in the in-class practice are consistent with the corresponding exercises in standard teaching.

After the giving of the suggested lecturing time, information about a time prompt is generated and presented on a teacher terminal, making it convenient for the following teacher to control the teaching progress in class lecturing.

The following teaching analysis unit specifically comprises:

a voice recognition and conversion unit for converting audio data of the following teaching recorded and broadcast data into information about voice text by using a voice recognition technology, and counting word frequency numbers of keywords in information about following voice text corresponding to each of the knowledge points, wherein the keywords are consistent with keywords in a standard course;

a text similarity analysis unit for performing comparative analysis on the word frequency numbers of the keywords corresponding to each of the knowledge points in the information about standard voice text and the word frequency numbers of the keywords corresponding to each of the knowledge points in the information about following voice text, so as to determine the similarity between the information about following voice text and the information about standard voice text; and a split-screen comparison presentation unit for simultaneously presenting, to the following teacher, the recorded following teaching course and a standard teaching course in the manner of double-window or multi-window on the same screen or in the manner of multi-screen synchronous display, thereby realizing intuitive comparison.

The split-screen comparison presentation unit can also perform the following functions: the comparison of the pre-class test analysis results, the comparison between the suggested lecturing time and the actual lecturing time, the comparison of similarity between the information about following voice text and the information about standard voice text, and/or the comparison of in-class practice test results.

The following teaching analysis unit further comprises:

an improvement suggestion generation unit for giving, during split-screen comparison presentation, information about an evaluation and an improvement suggestion for each of the stages during following teaching according to the knowledge point-based association relationship, which is determined according to the relational database, among various types of data in conjunction with the comparison results.

The following teaching analysis unit further comprises:

a following degree calculation unit for calculating a following coefficient $F_n$ for each following teaching, and making multiple following coefficients $F_n$ in a certain period into a following coefficient change curve and presenting same to the following teacher, wherein the formula for calculating the following coefficient is:

$$F_n = 1 - \left( \alpha \left( \sum_1^n \delta_1 \left( \frac{|ST_1 - PT_1|}{ST_1} \right) + \ldots + \delta_i \left( \frac{|ST_i - PT_i|}{ST_i} \right) \right) + \beta \left( \frac{|E1 - E2|}{E2} \right) + \gamma \left( \frac{|S1 - S2|}{S2} \right) \right)$$

wherein $ST_i$ represents a suggested lecturing time of a knowledge point i, $PT_i$ represents an actual lecturing time of the knowledge point i, i=1, 2 ... n, n being a positive integer and used for representing the number of knowledge points, and δ represents a weight coefficient for an ith knowledge point, where $\delta_1 + \ldots + \delta_i = 1$;

E1 represents evaluation data for the teaching of the following teacher, E2 represents evaluation data for the teaching of the standard teacher, the evaluations are usually given by the student over the Internet teaching platform, and the two pieces of evaluation data adopt the same standard;

S1 represents an average score for all in-class practice in a following class, and S2 represents an average score for all in-class practice in a standard class; and α, β, γ are used as balance coefficients, α+β+γ=1, the value of α is 0.30-0.50, the value of β is 0.10-0.30, and the value of γ is 0.20-0.40.

The present disclosure forms, by relying on the Internet teaching platform and taking the teaching recording and broadcasting system as the main means of realization, a standard teaching recorded and broadcast course with segmentation features by performing standardization and modular segmentation processing on the class teaching process, and on this basis, while a following teacher conducts local following teaching, the present disclosure tests students' master of basic knowledge, compares the test results between the following teaching and a standard class, provides the guidance of a suggested lecturing time for the following teacher in conjunction with a lecturing time for knowledge points in a standard course, and records and compares the actual execution conditions. In order to further reflect the characteristics of following teaching, after the completion of a following class so as to form a following teaching recorded and broadcast course, the present disclosure comparatively presents, in the manner of multi-window on the same screen or in the manner of multi-screen synchronous display, the differences and similarities between the following teaching and the standard teaching to the following teacher, and provides data support, including similarity of voice text, generation of an improvement suggestion, the calculation of a following degree, etc., so as to be able to provide effective data support for following teaching and facilitate improving the efficiency of following teaching and the effect of following teaching.

The additional aspects and advantages of the present disclosure will be partly presented in the following description, partly become apparent in the following description or be appreciated through the embodiments or examples of the present disclosure.

BRIEF DESCRIPTION OF THE DRAWINGS

In order to illustrate the technical solutions in embodiments of the present disclosure more clearly, the accompanying drawing used in the description of the embodiments of the present disclosure will be briefly introduced hereinebelow; and apparently, the accompanying drawing illustrates only some embodiments of the present disclosure, and a person skilled in the art can also derive other drawings according to the contents of the embodiments of the present disclosure and these drawings without any inventive effort.

DETAILED DESCRIPTION

The present disclosure will now be described more fully hereinafter with reference to the accompanying drawings, in which exemplary embodiments of the present disclosure are shown. The present disclosure may, however, be embodied in many different forms and should not be construed as limited to the embodiments set forth herein. Rather, these embodiments are provided so that this disclosure is thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting and/or capital letters has no influence on the scope and meaning of a term: the scope and meaning of a term are the same, in the same context, whether or not it is highlighted and/or in capital letters. It is appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only and in no way limits the scope and meaning of the invention or of any exemplified term. Likewise, the invention is not limited to various embodiments given in this specification.

It is understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It is understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below can be termed a second element, component, region, layer or section without departing from the teachings of the present disclosure.

It is understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It are also appreciated by those of skill in the art that references to a structure or feature that is disposed "adjacent" to another feature may have portions that overlap or underlie the adjacent feature.

The terminology used herein is for the purpose of describing particular embodiments only and is not intended to be limiting of the invention. As used herein, the singular forms "a," "an," and "the" are intended to include the plural forms as well, unless the context clearly indicates otherwise. It is further understood that the terms "comprises" and/or "comprising," or "includes" and/or "including" or "has" and/or "having" when used in this specification specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the figures. It is understood that relative terms are intended to encompass different orientations of the device in addition to the orientation shown in the figures. For example, if the device in one of the figures is turned over, elements described as being on the "lower" side of other elements would then be oriented on the "upper" sides of the other elements. The exemplary term "lower" can, therefore, encompass both an orientation of lower and upper, depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present disclosure belongs. It is further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around," "about," "substantially" or "approximately" shall generally mean within 20 percent, preferably within 10 percent, and more preferably within 5 percent of a given value or range. Numerical quantities given herein are approximate, meaning that the terms "around," "about," "substantially" or "approximately" can be inferred if not expressly stated.

As used herein, the terms "comprise" or "comprising," "include" or "including," "carry" or "carrying," "has/have" or "having," "contain" or "containing," "involve" or "involving" and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the invention.

Embodiments of the invention are illustrated in detail hereinafter with reference to accompanying drawings. It should be understood that specific embodiments described herein are merely intended to explain the invention, but not intended to limit the invention.

The disclosure will now be described in details in connection with the embodiments. The following embodiments are intended for facilitating those skilled in the art to understand the present disclosure, instead of limiting the present disclosure in any way. It should be noted that a number of variations and modifications may be made by those skilled in the art without departing from the inventive concept, all of which fall within the scope of protection of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip.

The term module may include memory (shared, dedicated, or group) that stores code executed by the processor. The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

In the present disclosure, computer components may include physical hardware components and virtual software components. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The detailed description of the present disclosure will be further described in detail below in conjunction with the drawings.

Figure 1:
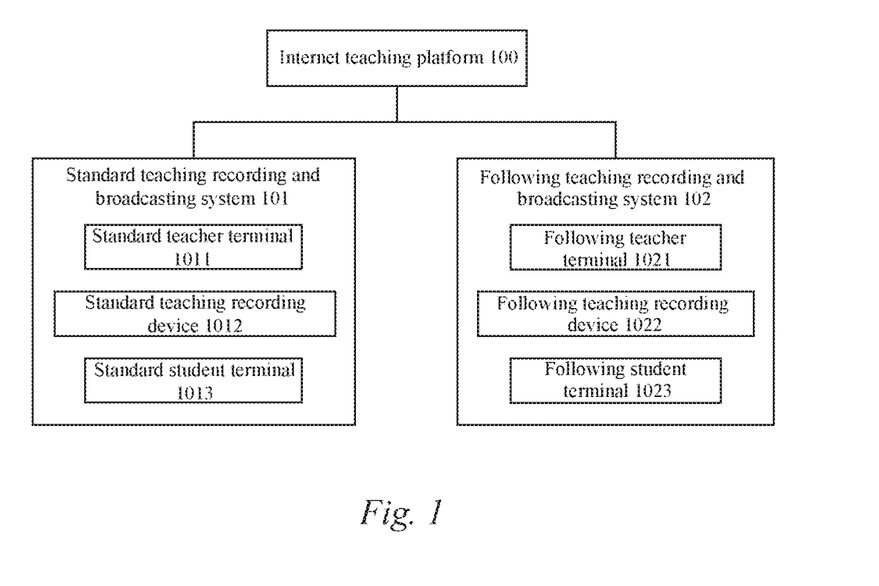
FIG. 1 is a schematic diagram of an architecture of an Internet teaching platform of the present disclosure.

FIG. 1 is a schematic diagram of an architecture of an Internet teaching platform of the present disclosure. As shown in FIG. 1, the Internet teaching platform 100 comprises a standard teaching recording and broadcasting system 101, a following teaching recording and broadcasting system 102, a standard teacher terminal 1011, a following teacher terminal 1021, a standard teaching recording device 1012, a following teaching recording device 1022, a standard student terminal 1013, and a following student terminal 1023, wherein the standard teaching recording and broadcasting system 101 and the following teaching recording and broadcasting system 102 may further specifically comprise various image, sound and operation action collection devices.

The terminal of the present disclosure comprises: a processor, a network module, a control module, a display module and an intelligent operating system. The terminal can be provided with a variety of data interfaces for connecting to various extension devices and accessories via a data bus. The intelligent operating system comprises Windows, Android and its improvements, and iOS, on which application software can be installed and run, and the functions of various types of application software, services, and application program stores/platforms under the intelligent operating system are realized.

The terminal of the present disclosure can be connected to the Internet by using a connection mode of RJ45/Wi-Fi/Bluetooth/2G/3G/4G/G.hn:Zigbee/Z-ware/RFID, etc., and can be connected to other terminals or other computers and devices via the Internet. By using a variety of data interfaces or bus modes, such as 1394/USB/serial/SATA/SCSI/PCI-E/Thunderbolt/data card interface, and by using a connection mode like an audio and video interface, such as HDMI/YpbPr/SPDIF/AV/DVI,VGA/TRS/SCART/Displayport various extension devices and accessories are connected to constitute a conference/teaching device interaction system. The functions of acoustic control and shape control are realized by using a sound capture control module and a motion capture control module in the form of software, or by using a sound capture control module and a motion capture control module in the form of data bus on-board hardware.

The display, projection, voice access, audio and video playing, as well as digital or analog audio and video input and output functions are realized by connecting to a display/projection module, a microphone, a sound device and other audio and video devices via audio and video interfaces. The image access, sound access, use control and screen recording of an electronic whiteboard, and an RFID reading function are realized by connecting to a camera, a microphone, the electronic whiteboard and an RFID reading device via data interfaces, and a mobile storage device, a digital device and other devices can be accessed and managed and controlled via corresponding interfaces. The functions including manipulation, interaction and screen shaking between multi-screen devices are realized by means of DLNA/IGRS technologies and Internet technologies.

In the present disclosure, the processor is defined to include but not limited to: an instruction execution system, such as a computer/processor-based system, an application specific integrated circuit (ASIC), a computing device, or a hardware and/or software system capable of fetching or acquiring logic from a non-transitory storage medium or a non-transitory computer readable storage medium and executing instructions contained in the non-transitory storage medium or the non-transitory computer readable storage medium. The processor may further comprise any controller, state machine, microprocessor, Internet-based entity, service or feature, or any other analog, digital, and/or mechanical implementation thereof.

In the present disclosure, the computer readable storage medium is defined to include but not limited to: any medium capable of containing, storing or maintaining programs, information and data. The computer readable storage medium comprises any of many physical media, such as an electronic medium, a magnetic medium, an optical medium, an electromagnetic medium or a semiconductor medium. More specific examples of memories suitable for the computer readable storage medium and the terminal and server include but not limited to: a magnetic computer disk (such as a floppy disk or a hard drive), a magnetic tape, a random access memory (RAM), a read only memory (ROM), an erasable programmable read only memory (EPROM), a compact disk (CD) or digital video disk (DVD), Blu-ray memory, a solid state disk (SSD), and a flash memory.

In the present disclosure, the Internet can comprise a local area network and wide area Internet, may be wired Internet or may be wireless Internet, or may be any combination of these networks.

Figure 2:
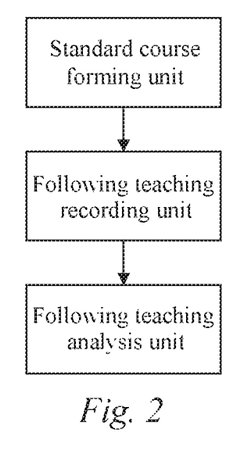
FIG. 2 is a schematic diagram of main units of a following teaching system of the present disclosure.

As shown in FIG. 2, according to the specific embodiments of the Internet teaching platform-based following teaching system of the present disclosure, the Internet teaching platform has a class teaching recording function, and the following teaching system comprises the following units: a standard course forming unit, a following teaching recording unit, and a following teaching analysis unit.

The standard course forming unit is used for collecting class teaching data of a standard teacher by using a teaching recording and broadcasting system of the Internet teaching platform, and processing the class teaching data in segments, for example, in a pre-class test stage, a class lecturing stage and an in-class practice stage, wherein each of the stages is identified and distinguished by using information about a time identifier, and the time identifier is saved together with the class teaching data so as to constitute standard teaching recorded and broadcast data, thereby forming a standard teaching recorded and broadcast course.

The internet teaching platform may be a variety of available Internet teaching platforms that have access to the Internet, have an interaction function and have the function of recording the class teaching process. Such Internet teaching platforms generally comprise a teacher terminal, a student terminal, a multimedia teaching device, a class teaching recording device, and a local or cloud server, and these devices are communicatively connected to one another via wired or wireless, local area or wide area Internet, etc.

The teaching recording and broadcasting system can be communicatively connected to the Internet teaching platform, such that class teaching data, such as image data, audio data and motion data (for example, data of operation actions, such as a teaching terminal operation action, an electronic whiteboard operation action, and a drawing action of a drawing board) can be respectively collected by using a recording device, such as an image collection device, an audio collection device and/or an operation action collection device, and moreover, statistical analysis can be performed on other real-time data generated during the teaching process and processing, such as storing and uploading, can be performed on a variety of obtained data.

Preferably, these pieces of recorded and broadcast data can be saved, in the form of data streams, to a local storage device, a server storage device of the Internet teaching platform, or a cloud storage device connected to the server, such as a disk storage array.

The so-called standard teacher refers to such a teacher whose teaching recorded and broadcast course for class teaching is used as a standard recorded and broadcast course, and is learned and referenced by a following teacher or recommended to a following teacher for learning and reference, such that the following teacher performs local class teaching by taking same as a reference standard for imitative following teaching.

The standard teaching recorded and broadcast course can be shared on a platform over the Internet, such that a user who logs in to the teaching platform via the Internet can obtain same for operations of downloading, browsing, learning, etc.

The segmentation processing means that the class teaching process can be divided into a pre-class test stage, a class lecturing stage and an in-class practice stage, and these three stages generally have a sequentially logical relationship in terms of a time order. These three stages are segmented and identified by time identifiers, such as time stamps.

On the basis of these three stages, similar subdivision segmentation processing can be continued for the class teaching process, and each of the three stages, especially the class lecturing stage, can also be further divided into multiple sub-segments, for example, dividing the class lecturing stage into several lecturing sub-segments according to different knowledge points for lecturing.

During sub-stages and sub-segments, a relational database, with knowledge points serving as associated points or ties, is gradually established, such that an association relation, with knowledge points serving as key points or ties, is established among exercises in the pre-class test stage, the lecturing of knowledge points in the class lecturing stage, and exercises in in-class practice, and the association relation is saved to a relational database.

The division of these stages and sub-segments is preferably performed by segmenting and identifying (distinguishably identifying) same with time identifiers, with the knowledge points serving as linking ties, which generally does not need to cut and segment data.

The following teaching recording unit is used for collecting class teaching data of a following teacher by using a teaching recording and broadcasting system of the Internet teaching platform, analyzing pre-class test result data of the class teaching data in real time, comparing the results analyzed in real time with corresponding data of the standard teaching recorded and broadcast data, providing a suggested lecturing time for a class lecturing stage of the following teacher, and recording the suggested lecturing time and an actual lecturing time, wherein the suggested lecturing time and the actual lecturing time are saved together with the class teaching data so as to constitute following teaching recorded and broadcast data, thereby forming a following teaching recorded and broadcast course.

Preferably, the suggested lecturing time can be displayed on the screen of a terminal of the teacher terminal in a manner of a time prompt, such that the teacher reasonably controls the teaching progress according to the time prompt.

The so-called following teacher is a teacher who imitates or follows the teaching recorded and broadcast course of the standard teacher to perform local class teaching. The following teaching recorded and broadcast course can also be shared on the platform over the Internet, but the following teacher can also choose not to upload same to the Internet teaching platform, or choose to upload same to the Internet teaching platform, but only for the downloading, browsing, learning, etc. by students within a certain range, such as students of this class or this school, that is to say, the following teaching recorded and broadcast course can be shared in levels according to the will of the following teacher.

The teaching recording and broadcasting system and the teaching recording and broadcasting system for the standard course may be the same, or may be different, as long as it is ensured that the class recorded and broadcast data with the same standard or resolution can be obtained.

It is preferred that the recording and broadcasting system used by the standard teacher and the recording and broadcasting system used by the following teacher use devices of the same model, and it is particularly preferred that the manner in which these devices are mounted in the classroom remain consistent, such that the data collected by the recording and broadcasting system remain consistent in terms of technical parameters.

Teaching recorded and broadcast data of the following teacher can also be respectively saved, in the form of data streams, to a local storage device, a storage device of a server, or a cloud storage device connected to the server, such as a disk storage array. The teaching recorded and broadcast data of the following teacher can remain consistent with that of the standard teacher, which will not be described again herein.

The following teaching analysis unit is used for analyzing the following teaching recorded and broadcast data ex post facto, comparing same with the standard teaching recorded and broadcast data in segments, including the comparison between the suggested lecturing time and the actual lecturing time in each of the stages, and the comparison of information about voice text in each of the stages, and synchronously playing back the following teaching recorded and broadcast course and the standard teaching recorded and broadcast course and displaying same to the following teacher.

The processing of comparison may be performed by a local server, and the data may be submitted to a cloud for analysis and comparison by dedicated cloud computing centers, which may be a company providing commercial services.

Optionally, all the operations, such as comparison and analysis, are performed by a local server or computer device.

Figure 3:
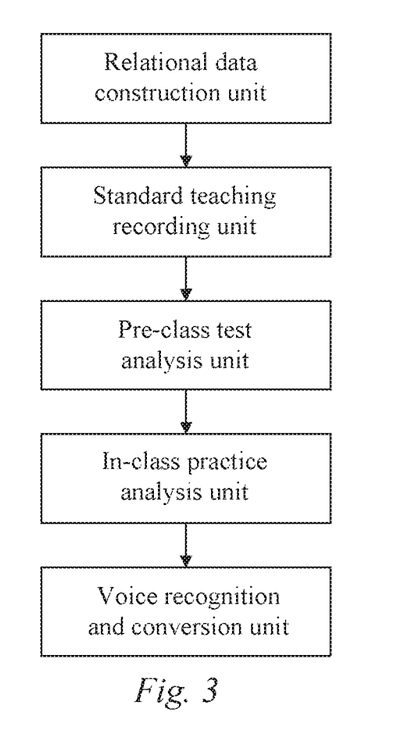
FIG. 3 is a schematic diagram of subunits of a standard course forming unit of the present disclosure.

As shown in FIG. 3, the standard course forming unit specifically comprises: a relational data construction unit, a standard teaching recording unit, a pre-class test analysis unit, an in-class practice analysis unit and a voice recognition and conversion unit.

a relational data construction unit for dividing knowledge points of a class syllabus of each course, generating keywords by using the knowledge points as data items and according to the knowledge points, establishing a correlation between the keywords and the knowledge points, and establishing, on the basis of the data items and according to the comparison of information about attributes between exercises in a pre-class test and exercises in in-class practice, an association relationship, which takes the knowledge points as associated points, among various types of data, thereby constructing a relational database;

The division of the knowledge points comprises three steps:

step I: dividing the class syllabus into basic knowledge and newly lectured knowledge to serve as a first-level data item;

step II: further dividing the basic knowledge into several basic knowledge points, and further dividing the newly lectured knowledge into several newly lectured knowledge points to serve as a second-level data item;

and step III: based on the association relationship between the basic knowledge points and the newly lectured knowledge points, further improving the data structure of the relational database.

Preferably, the relational database is independently saved as a constituent part of the standard teaching recorded and broadcast data.

Preferably, during the process of a standard teacher conducting class teaching, which herein mainly refers to during the process of course lecturing, including the lecturing of basic knowledge (usually retrospective lecturing) and the lecturing of newly lectured knowledge, a correlation between knowledge or knowledge points and a duration for recorded and broadcast data is established, wherein the duration is divided by a time identifier, preferably information about a time stamp, and is saved to the relational database.

For example, during the class lecturing of the basic knowledge, a correlation between the basic knowledge and a duration for the standard recorded and broadcast data is established.

Preferably, a correlation between the basic knowledge points and a sub-duration for the standard recorded and broadcast data is further established, wherein the sub-duration is further subdivision of the duration. The division of the duration or sub-duration may be manually clicked on for confirmation by the standard teacher during class lecturing, or may be divided according to the searching of keywords or manual distinguishing ex post facto.

That is to say, after the completion of the standard teaching recording process, a relational database, with the knowledge or knowledge points serving as an association identifier, for "data entries for class teaching target-exercises in a pre-class test-segmented data in lecturing-exercises in in-class practice" can be formed, such that segment division can be performed on the standard teaching recorded and broadcast course and a contextual correlation can be established.

The standard teaching recording unit is used for collecting the class teaching data by using the teaching recording and broadcasting device of the teaching recording and broadcasting system, for example, respectively collecting image data, audio data and motion data by using an image collection device, an audio collection device and/or a motion collection device, wherein these pieces of data can be respectively saved in the form of data streams and can be time stamped by a time stamp.

The pre-class test analysis unit is used for performing real-time analysis on test results of a basic knowledge test conducted by a student over a student terminal after the start of class teaching and before the class lecturing stage, so as to form pre-class test result analysis data for knowing about the current student's mater of related basic knowledge, preferably basic knowledge points, thereby becoming more targeted in the subsequent class lecturing, and thus facilitating the subsequent conducting of standard teaching.

The test analysis data can not only be provided in real time, for example, presented to a standard teacher, but also can be saved separately, and preferably, saved together as a constituent part of the standard teaching recorded and broadcast data.

The in-class practice analysis unit is used for performing real-time analysis on test results of an in-class practice test conducted by a student over a student terminal before the end of class teaching and after the class lecturing stage, so as to form in-class practice result analysis data for knowing about the student's mater of newly lectured knowledge, preferably the mater of newly lectured knowledge points, thereby providing technical support for the self-analysis of the teaching process by a teacher, and thus facilitating the teacher in knowing about the teaching effect.

The in-class practice analysis data can not only be provided in real time, for example, presented to a standard teacher, but also can be saved separately, and preferably, saved together as a constituent part of the standard teaching recorded and broadcast data.

The voice recognition and conversion unit is used for converting audio data of the class teaching data into information about standard voice text by using a voice recognition technology, and counting word frequency numbers of keywords in information about standard voice text corresponding to each of the knowledge points. Preferably, the information about standard voice text comprises information about a time identifier of original audio data, such as preferably information about a time stamp, such that a correlation between voice text and the audio data can be established based on the information about a time identifier.

Preferably, the information about standard voice text with the information about a time identifier is saved together as a constituent part of the standard teaching recorded and broadcast data, and is displayed on a terminal device in the form of subtitles during on-demand playback.

Preferably, the data entries in the relational data construction unit comprise a correlation between knowledge or knowledge points and a duration for recorded and broadcast data (divided based on a time identifier, preferably information about a time stamp), and the information about standard voice text is divided and a correlation with the knowledge or knowledge points is established and saved together as a constituent part of the standard teaching recorded and broadcast data.

Figure 4:
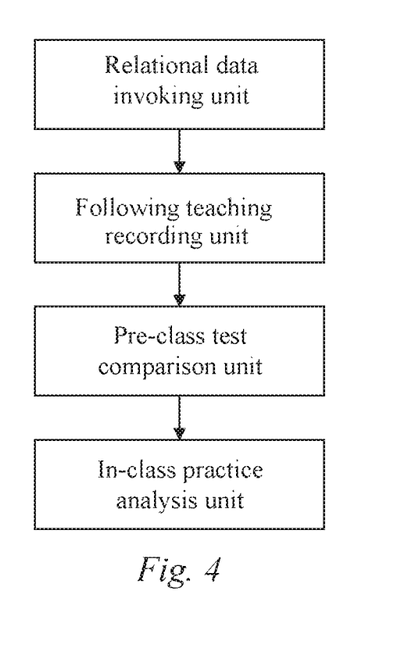
FIG. 4 is a schematic diagram of subunits of a following teaching recording unit of the present disclosure.

As shown in FIG. 4, the following teaching recording unit specifically comprises: a relational data invoking unit, a following teaching recording unit, a pre-class test comparison unit and an in-class practice analysis unit.

The relational data invoking unit is used for retrieving the relational database at the beginning of following class teaching, so as to provide data support for the following unit, and the relational database may be retrieved before or at the starting of the following class teaching, as long as the execution of the following teaching process is not delayed.

The following teaching recording unit is used for collecting the class teaching data by using the teaching recording and broadcasting device of the teaching recording and broadcasting system, for example, respectively collecting image data, audio data and motion data by using an image collection device, an audio collection device and/or a motion collection device, wherein these pieces of data can be respectively saved in the form of data streams and can be time stamped by a time stamp.

These recording devices preferably remain the same model as that of the previous corresponding devices, preferably being also the same or similar in terms of the mounting mode thereof in classroom, such as the orientation of the image collection device, the distance between an audio collection device and a lecturer, and the setting of an electronic whiteboard.

The pre-class test comparison unit is used for performing real-time analysis on test results of a basic knowledge test conducted by a student over a student terminal after the start of following class teaching and before a following class lecturing stage so as to form pre-class test result analysis data, comparing the pre-class test analysis result with a pre-class test analysis result of a standard course, providing, to the following teacher, the student's master of the basic knowledge points as well as the difference between the student and a student in a standard class, and giving a suggested lecturing time concerning the knowledge points according to the difference and information about an association of the knowledge points in the relational database in conjunction with a lecturing time for the knowledge points in standard class.

Preferably, according to the weight of the association between the basic knowledge points and the newly lectured content, the current suggested following lecturing time is given according to the standard lecturing time.

Preferably, information about a time prompt is generated and presented on a teacher terminal, making it convenient for the following teacher to control the teaching progress in class lecturing.

The in-class practice analysis unit is used for performing real-time analysis on test results of an in-class practice test conducted by a student over a student terminal before the end of class teaching and after the class lecturing stage, so as to form in-class practice result analysis data for knowing about the student's mater of newly lectured content, thereby facilitating the standard teacher in knowing about the teaching effect. The exercises in the in-class practice are consistent with those in a standard teaching process.

The in-class practice analysis data may be saved separately, or saved together with the teaching recorded and broadcast data as affiliated data.

Figure 5:
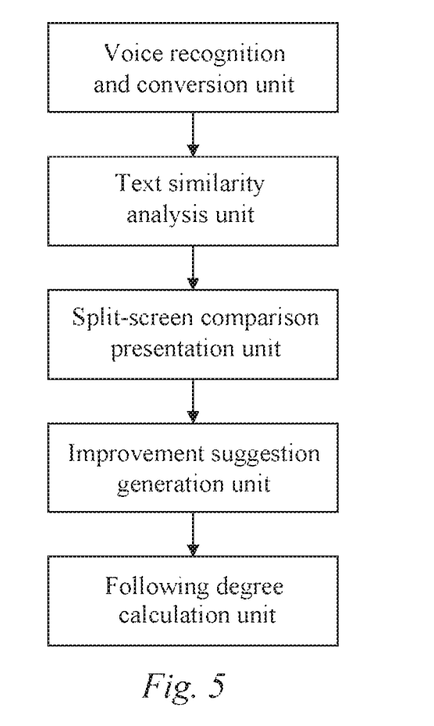
FIG. 5 is a schematic diagram of subunits of a following teaching analysis unit of the present disclosure.

As shown in FIG. 5, the following teaching analysis unit specifically comprises: a voice recognition and conversion unit, a text similarity analysis unit, a split-screen comparison presentation unit, an improvement suggestion generation unit and a following degree calculation unit.

The voice recognition and conversion unit is used for converting audio data of the following teaching recorded and broadcast data into information about voice text by using a voice recognition technology, and counting word frequency numbers of keywords in information about voice text corresponding to each of the knowledge points, wherein the keywords are consistent with keywords in a standard course.

Preferably, the information about voice text with the information about a time identifier is saved together as a constituent part of the following teaching recorded and broadcast data, and is displayed on a terminal device in the form of subtitles during on-demand playback.

Preferably, according to the correlation between knowledge or knowledge points and a duration for recorded and broadcast data (divided based on a time identifier, preferably information about a time stamp), the information about voice text is divided, and a correlation with the knowledge or knowledge points is established and is saved together as a constituent part of the following teaching recorded and broadcast data. The correlation between knowledge points and a voice is defined or differentiated according to a time stamp, or is differentiated. The specific correspondence may be recognized or marked by a teacher by means of a click-on confirmation operation during the recording process, or may be automatically confirmed by means of the searching of keywords and then is manually confirmed, etc.

The text similarity analysis unit is used for performing comparative analysis on the word frequency numbers of the keywords corresponding to each of the knowledge points in the information about standard voice text and the word frequency numbers of the keywords corresponding to each of the knowledge points in the information about following voice text, so as to determine the similarity between the information about following voice text and the information about standard voice text.

There are many specific text similarity algorithms in the prior art, such as a comparison technique for academic paper anti-plagiarism. The use of different algorithms will generate slight difference in terms of the obtained similarity coefficients however, the similarity coefficient should not be too low or too high. The present disclosure adopts a conventional paper similarity comparison algorithm, and the preferred similarity coefficient is between 0.20 to 0.68.

The setting of the similarity coefficient is given on the basis of a great quantity of statistical data. The selection of the similarity coefficient within this range generally cannot only ensure that knowledge points cannot missed during class lecturing, but also can maintain the independence and freedom of the expression of the following teacher, because if the similarity coefficient is too high, an impression of a similarly completely imitative teaching, such as talking like a parrot will be given to people, which is not conducive to the growth and self-awareness stimulation of the following teacher, and if the similarity coefficient is too low, the following teacher may face the problem of insufficient lecturing of the knowledge points.

Preferably, knowledge points-based voice text is compared in segments according to the correlation, determined by the relational database, between the information about voice text and the knowledge or knowledge points, so as to more accurately determine the similarity coefficients of the two voice text.

The split-screen comparison presentation unit is used for simultaneously presenting, to the following teacher, the recorded following teaching course and a standard teaching course in the manner of double-window or multi-window on the same screen or in the manner of multi-screen synchronous display, thereby realizing intuitive comparison. The split-screen comparison presentation unit may also be further used for performing: the comparison of the pre-class test analysis results, the comparison between the suggested lecturing time and the actual lecturing time, the comparison of similarity between the information about following voice text and the information about standard voice text, and/or the comparison of in-class practice test results.

The comparison specifically comprises the comparison between the related analysis data of each stage and sub-stage, such as the comparison of statistical analysis in the pre-class test stage, and the comparison between the suggested lecturing time and actual lecturing time for the knowledge points given on this basis, the comparison of similarity coefficients of voice text in each stage and sub-stage, and the comparison of test results of in-class practice.

The improvement suggestion generation unit is used for giving, during split-screen comparison presentation, information about an evaluation and an improvement suggestion for each of the stages during following teaching according to the knowledge point-based association relationship, which is determined according to the relational database, among various types of data in conjunction with the analysis results of pre-class test, class lecturing and in-class practice.

Preferably, the evaluation information and the improvement suggestion are selected by the following teacher in an optional manner according to the self-evaluation combined with the analysis results.

Preferably, the following teacher can input the evaluation information and the improvement suggestion after viewing the comparison.

Preferably, the evaluation information and the improvement suggestion confirmed or input by the following teacher are saved, by means of the association relationship with each of the stages and sub-stages, to the following teaching recorded and broadcast data as a part of the following recorded and broadcast data.

The following degree calculation unit is used for calculating a following coefficient $F_n$ for each following teaching, and making multiple following coefficients $F_n$ in a certain period into a following coefficient change curve and presenting same to the following teacher.

The following coefficient is mainly obtained, by means of calculation according to the following formula, by taking related data of the standard teacher as the basis for original comparison, wherein the related data used may comprise: a suggested lecturing time $ST_i$ and an actual lecturing time $PT_i$ of the following teacher for a knowledge point i, data of evaluation E1 on the lecturing of the following teacher and data of evaluation E2 on the lecturing of the standard teacher, and an average score S1 for each in-class practice in following class and an average score S2 for each in-class practice in standard class. The following coefficient can reflect, to some extent, the current growth degree of the following teacher, the acceptability of the student and the degree of improvement of the teaching effect.

The formula for calculating the following coefficient is:

$$F_n = 1 - \left( \alpha \left( \sum_1^n \delta_1 \left( \frac{|ST_1 - PT_1|}{ST_1} \right) + \ldots + \delta_i \left( \frac{|ST_i - PT_i|}{ST_i} \right) \right) + \beta \left( \frac{|E1 - E2|}{E2} \right) + \gamma \left( \frac{|S1 - S2|}{S2} \right) \right)$$

Wherein $ST_i$ represents a suggested lecturing time of a knowledge point i, $PT_i$ represents an actual lecturing time of the knowledge point i, i=1, 2 . . . n, n being a positive integer and used for representing the number of knowledge points, and S represents a weight coefficient for an ith knowledge point, where $\delta_1 + \ldots + \delta_i = 1$;

E1 represents evaluation data for the teaching of the following teacher, E2 represents evaluation data for the teaching of the standard teacher, the evaluations are usually given by the student over the Internet teaching platform, and the two pieces of evaluation data adopt the same standard;

S1 represents an average score for all in-class practice in a following class, and S2 represents an average score for all in-class practice in a standard class; and $\alpha$, $\beta$, $\gamma$ are used as balance coefficients, $\alpha+\beta+\gamma=1$, which can be set according to actual needs, and after a great quantity of data statistics and analysis, it is preferable that the value of $\alpha$ is 0.30-0.50, the value of $\beta$ is 0.10-0.30, and the value of $\gamma$ is 0.20-0.40. For following teaching, the value range can reflect the core of the following teaching and can also take into account the student's reflection and actual effect, and can better balance the relationship of these factors.

Preferred embodiments of the present disclosure introduced above are intended to make the spirit of the present disclosure more apparent and easy to understand, but not to limit the present disclosure. Any modifications, replacements and improvements made within the spirit and principles of the present disclosure should be regarded as within the scope of protection of the claims of the present disclosure.

INDUSTRIAL APPLICABILITY

The present disclosure forms, by relying on the Internet teaching platform and taking the teaching recording and broadcasting system as the main means of realization, a standard teaching recorded and broadcast course with segmentation features by performing standardization and modular segmentation processing on the class teaching process, and on this basis, while a following teacher conducts local following teaching, the present disclosure tests students' master of basic knowledge, compares the test results between the following teaching and a standard class, provides the guidance of a suggested lecturing time for the following teacher in conjunction with a lecturing time for knowledge points in a standard course, and records and compares the actual execution conditions. In order to further reflect the characteristics of following teaching, after the completion of a following class so as to form a following teaching recorded and broadcast course, the present disclosure comparatively presents, in the manner of multi-window on the same screen or in the manner of multi-screen synchronous display, the differences and similarities between the following teaching and the standard teaching to the following teacher, and provides data support, including similarity of voice text, generation of an improvement suggestion, the calculation of a following degree, etc., so as to be able to provide effective data support for following teaching and facilitate improving the efficiency of following teaching and the effect of following teaching.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An Internet teaching platform-based following teaching system, the Internet teaching platform having a class teaching recording function, and the following teaching system comprising:
a processor, wherein the processor is configured to perform operations comprising:
collecting class teaching data of a standard teacher by using a teaching recording and broadcasting system of the Internet teaching platform, and processing the class teaching data in segments comprising, a pre-class test stage, a class lecturing stage and an in-class practice stage, wherein each of the stages is identified and distinguished by using information about a time identifier, and the information about the time identifier is saved together with the class teaching data so as to constitute standard teaching recorded and broadcast data, thereby forming a standard teaching recorded and broadcast course;
collecting class teaching data of a following teacher by using the teaching recording and broadcasting system of the Internet teaching platform, analyzing pre-class test result data, of the class teaching data in real time, comparing the results analyzed in real time with corresponding data of the standard teaching recorded and broadcast data, setting a suggested lecturing time for a class lecturing stage of the following teacher according to a comparison result, and recording the suggested lecturing time and an actual lecturing time, wherein the suggested lecturing time and the actual lecturing time are saved together with the class teaching data so as to constitute following teaching recorded and broadcast data, thereby forming a following teaching recorded and broadcast course; and
analyzing the following teaching recorded and broadcast data ex post facto, comparing same with the standard teaching recorded and broadcast data in segments, including the comparison between the suggested lecturing time and the actual lecturing time in each of the stages, and the comparison of information about voice text in each of the stages, and synchronously playing back the following teaching recorded and broadcast course and the standard teaching recorded and broadcast course and displaying same to the following teacher.

2. The following teaching system according to claim 1, where the operations further comprise:
dividing knowledge points of a class syllabus of each course, generating keywords by using the knowledge points as data, items and according to the knowledge points, establishing a correlation between the keywords and the knowledge points, and establishing, on the basis of the data items and according to the comparison of information about attributes between exercises in a pre-class test and exercises in in-class practice, an association relationship, which takes the knowledge points as associated points, among various types of data, thereby constructing a relational database;
collecting class teaching data by using a teaching recording and broadcasting device of a teaching recording and broadcasting system, for example, respectively collecting image data, audio data and motion data by using an image collection device, an audio collection device and/or a motion collection device, wherein the data can be respectively saved in the form of data streams and can be time stamped by a time stamp;
performing real-time analysis on test results of a basic knowledge test conducted by a student over a student terminal after the start of class teaching and before the class lecturing stage, so as to form pre-class test result analysis data;
performing real-time analysis on test results of an in-class practice test conducted by a student over a student terminal before the end of class teaching and after the class lecturing stage, so as to form in-class practice result analysis data; and
converting audio data of the class teaching data into information about voice text by using a voice recognition technology, and counting word frequency numbers of keywords in information about standard voice text corresponding to each of the knowledge points.

3. The following teaching system according to claim 2, wherein
the information about standard voice text comprises information about a time stamp of the audio data such that a correlation between voice text and the audio data can be established based on the information about a time stamp, and thus the information about standard voice text can be displayed in the form of subtitles when the standard teaching recorded and broadcast course is played back on-demand.

4. The following teaching system according to claim 2, wherein
the division of the knowledge points comprises three steps:
step I: dividing the class syllabus into basic knowledge and newly lectured knowledge to serve as a first-level data item;
step II: further dividing the basic knowledge into several basic knowledge points, and further dividing the newly lectured knowledge into several newly lectured knowledge points to serve as a second-level data item; and
step III: based on the association relationship between the basic knowledge points and the newly lectured knowledge points, further improving the data structure of the relational database.

5. The following teaching system according to claim 2, where the operations further comprise:
retrieving the relational database at the beginning of following class teaching, so as to provide data, support for the following execution of operations;
collecting class teaching data by using a teaching recording and broadcasting device of a teaching recording and broadcasting system, for example, respectively collecting image data, audio data and motion data by using an image collection device, an audio collection device and/or a motion collection device, wherein the data can be respectively saved in the form of data streams and can be time stamped by a time stamp;
performing real-time analysis on test results of a basic knowledge test conducted by a student over a student terminal after the start of following class teaching and before a following class lecturing stage so as to form pre-class test result analysis data, comparing the pre-class test analysis result with a pre-class test analysis result of a standard course, providing, to the following teacher, the student's master of the basic knowledge points as well as the difference between the student and a student in a standard class, and giving a suggested lecturing time concerning the knowledge points according to the difference and information about an association of the knowledge points in the relational database in conjunction with a lecturing time for the knowledge points in standard class; and performing real-time analysis on test results of an in-class practice test conducted by a student over a student terminal before the end of class teaching and after the class lecturing stage, so as to form in-class practice result analysis data.

6. The following teaching system according to claim 5, wherein the exercises in the pre-class test and the exercises in the in-class practice are consistent with the corresponding exercises in standard teaching.

7. The following teaching system according to claim 5, wherein after the giving of the suggested lecturing time, information about a time prompt is generated and presented on a teacher terminal, making it convenient for the following teacher to control the teaching progress in class lecturing.

8. The following teaching system according to claim 2, where the operations further comprise:

converting audio data of the following teaching recorded and broadcast data into information about voice text by using a voice recognition technology, and counting word frequency numbers of keywords in information about following voice text corresponding to each of the knowledge points, wherein the keywords are consistent with keywords in a standard course;

performing comparative analysis on the word frequency numbers of the keywords corresponding to each of the knowledge points in the information about standard voice text and the word frequency numbers of the keywords corresponding to each of the knowledge points in the information about following voice text, so as to determine the similarity between the information about following voice text and the information about standard voice text; and simultaneously presenting, to the following teacher, the recorded following teaching course and a standard teaching course in the manner of double-window or multi-window on the same screen or in the manner of multi-screen synchronous display, thereby realizing intuitive comparison.

9. The following teaching system according to claim 8, wherein the comparison of the pre-class test analysis results the comparison between the suggested lecturing time and the actual lecturing time, the comparison of similarity between the information about following voice text and the information about standard voice text, and/or the comparison of in-class practice test results.

10. The following teaching system according to claim 9, wherein the operations further comprise:

giving, during split-screen comparison presentation, information about an evaluation and an improvement suggestion for each of the stages during following teaching according to the knowledge point-based association relationship, which is determined according to the relational database, among various types of data in conjunction with the comparison results.

11. The following teaching system according to claim 10, wherein the operations further comprise:

calculating a following coefficient $F_n$ for each following teaching, and making multiple following coefficients $F_n$ in a certain period into a following coefficient change curve and presenting same to the following teacher, wherein the formula for calculating the following coefficient is:

$$F_n = 1 - \left( \alpha \left( \sum_1^n \delta_1 \left( \frac{|ST_1 - PT_1|}{ST_1} \right) + \ldots + \delta_i \left( \frac{|ST_i - PT_i|}{ST_i} \right) \right) + \beta \left( \frac{|E1 - E2|}{E2} \right) + \gamma \left( \frac{|S1 - S2|}{S2} \right) \right)$$

wherein $ST_i$ represents a suggested lecturing time of a knowledge point i, $PT_i$ represents an actual lecturing time of the knowledge point i, i=1, 2 . . . n, n being a positive integer and used for representing the number of knowledge points, and δ represents a weight coefficient for an ith knowledge point, where $\delta_1 + \ldots + \delta_i = 1$;

E1 represents evaluation data for the teaching of the following teacher, E2 represents evaluation data for the teaching of the standard teacher, the evaluations are usually given by the student over the Internet teaching platform, and the two pieces of evaluation data adopt the same standard;

S1 represents an average score for all in-class practice in a following class, and S2 represents an average score for all in-class practice in a standard class; and α, β, γ are used as balance coefficients, α+β+γ=1, the value of α is 0.30-0.50, the value of β is 0.10-0.30, and the value of γ is 0.20-0.40.

* * * * *